United States Patent
Bolzani

(10) Patent No.: US 7,393,176 B2
(45) Date of Patent: Jul. 1, 2008

(54) HANDLING UNIT FOR PALLETIZING

(75) Inventor: Dante Bolzani, Traversetolo (IT)

(73) Assignee: Feon S.R.L., Colorno (Parma) (IT)

( * ) Notice: Subject to any disclaimer, the term of this patent is extended or adjusted under 35 U.S.C. 154(b) by 239 days.

(21) Appl. No.: 10/558,891

(22) PCT Filed: Apr. 26, 2005

(86) PCT No.: PCT/IB2005/001124

§ 371 (c)(1),
(2), (4) Date: Dec. 1, 2005

(87) PCT Pub. No.: WO2006/000847

PCT Pub. Date: Jan. 5, 2006

(65) Prior Publication Data

US 2006/0269389 A1 Nov. 30, 2006

(30) Foreign Application Priority Data

Oct. 1, 2004 (IT) .......................... RE2004A0119

(51) Int. Cl.
B65B 35/50 (2006.01)

(52) U.S. Cl. .................. 414/799; 414/793.5; 414/792.6

(58) Field of Classification Search ............. 414/791.6, 414/792.6, 792.8, 793.4, 793.5, 793.6, 799; 269/289 MR; 254/112; 475/263, 158, 145, 475/269, 325, 340, 335, 331; 74/29, 31, 74/33, 89.11, 89.17, 89.18, 89.19, 422
See application file for complete search history.

(56) References Cited

U.S. PATENT DOCUMENTS

| | | | | |
|---|---|---|---|---|
| 3,346,128 A | * | 10/1967 | Hullhorst | .................. 414/789.1 |
| 3,844,422 A | * | 10/1974 | Smith et al. | ............... 414/789.9 |
| 4,614,473 A | * | 9/1986 | Kwauka et al. | ........... 414/792.6 |
| 4,792,121 A | * | 12/1988 | Annas et al. | ................... 254/95 |
| 4,927,318 A | * | 5/1990 | Hayden et al. | ............... 414/802 |
| 4,978,275 A | | 12/1990 | Reid et al. | |
| 6,341,698 B1 | * | 1/2002 | Wursthorn | ................... 209/552 |
| 6,431,817 B1 | * | 8/2002 | Simkowski | .............. 414/796.9 |
| 6,533,533 B1 | | 3/2003 | Heston | |
| 2005/0265817 A1 | * | 12/2005 | Blanc | .......................... 414/799 |

FOREIGN PATENT DOCUMENTS

| | | |
|---|---|---|
| EP | 0 257 447 A2 | 2/1988 |
| EP | 0257447 A1 | 3/1988 |
| EP | 1 321 396 A1 | 6/2003 |
| EP | 1 457 442 A1 | 9/2004 |
| EP | 1457442 A1 | 9/2004 |
| GB | 2 066 201 A | 7/1981 |
| GB | 2066201 A1 | 7/1981 |
| JP | 4-303327 | 10/1992 |
| JP | 04-303327 | 5/1994 |

* cited by examiner

Primary Examiner—Saul J. Rodriguez
Assistant Examiner—Gregory W Adams
(74) Attorney, Agent, or Firm—Browdy & Neimark

(57) ABSTRACT

A handling unit (1) for palletizing, comprising:
a support (2) for coupling to manipulator means;
a framework (3) associated with said support (2) and defining an aperture;
a pair of parallel opposing slide rails (5) fixed to said framework (3);
at least one flexible sliding panel (5) slidable along said rails (5) between an extended position in which it completely closes said aperture to enable it to support articles to be palletized, and a retracted position in which it opens said aperture to enable said articles to fall through said aperture;
drive means (18, 19) for sliding said panel (7) along said rails (5).

23 Claims, 8 Drawing Sheets

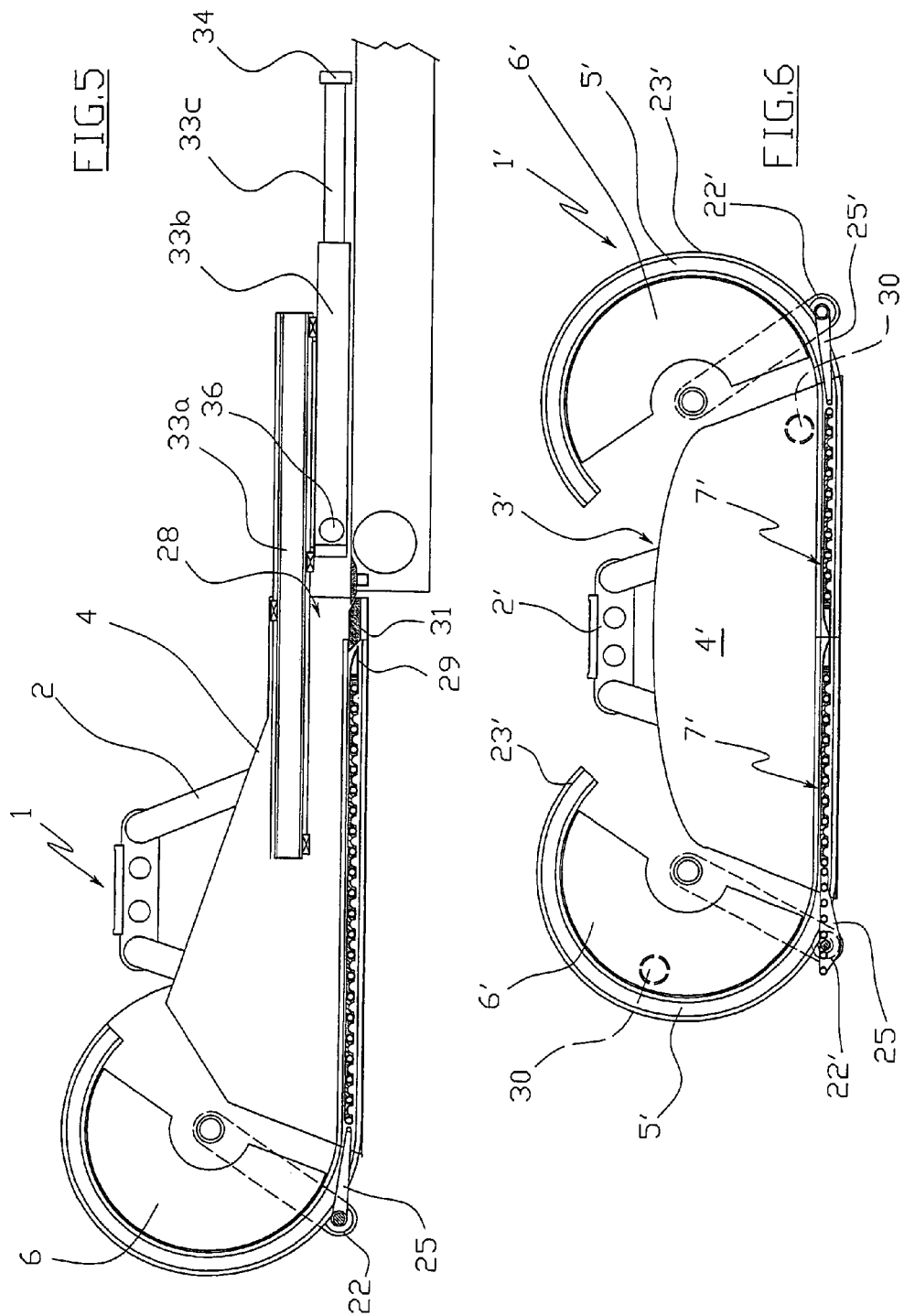

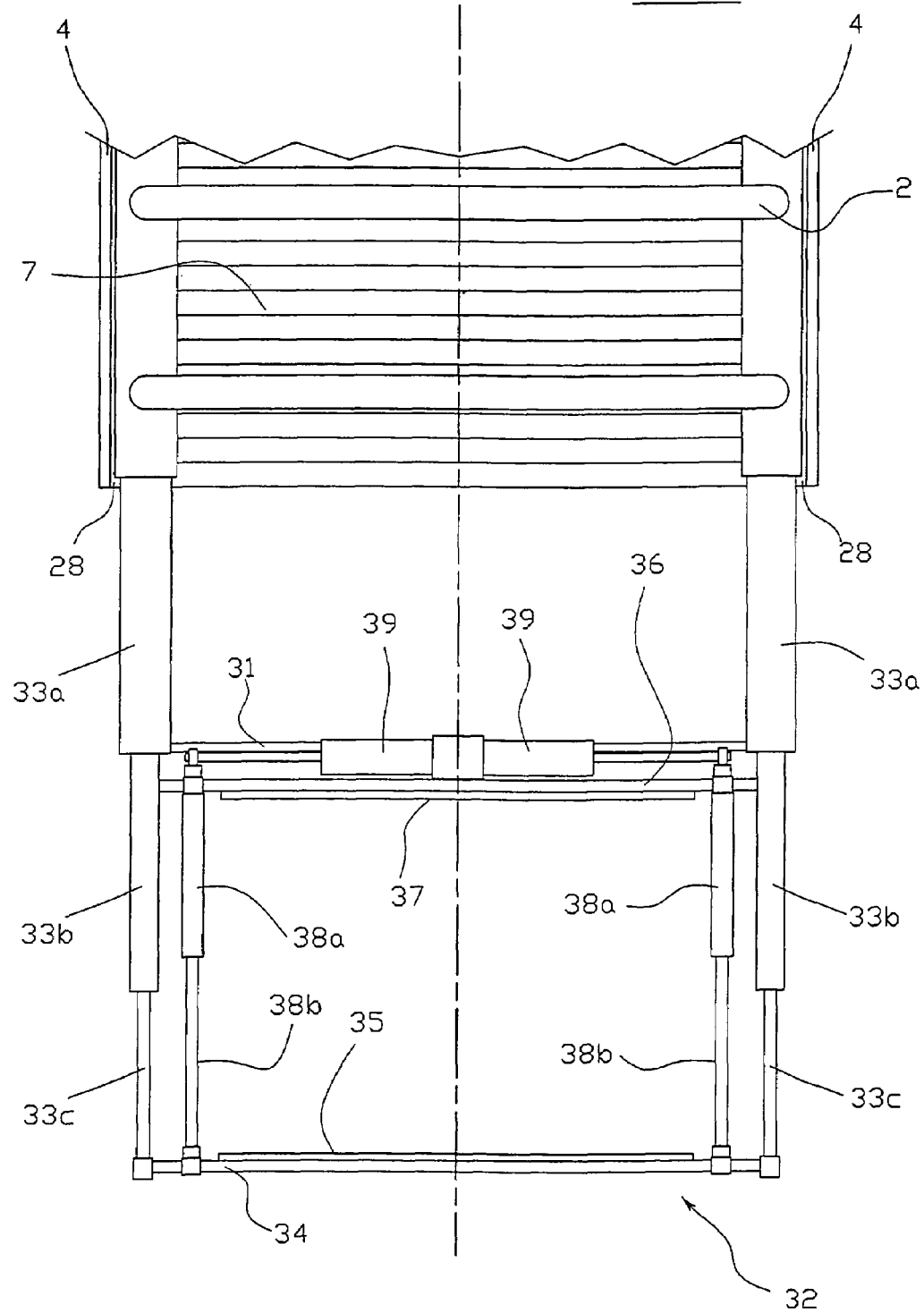

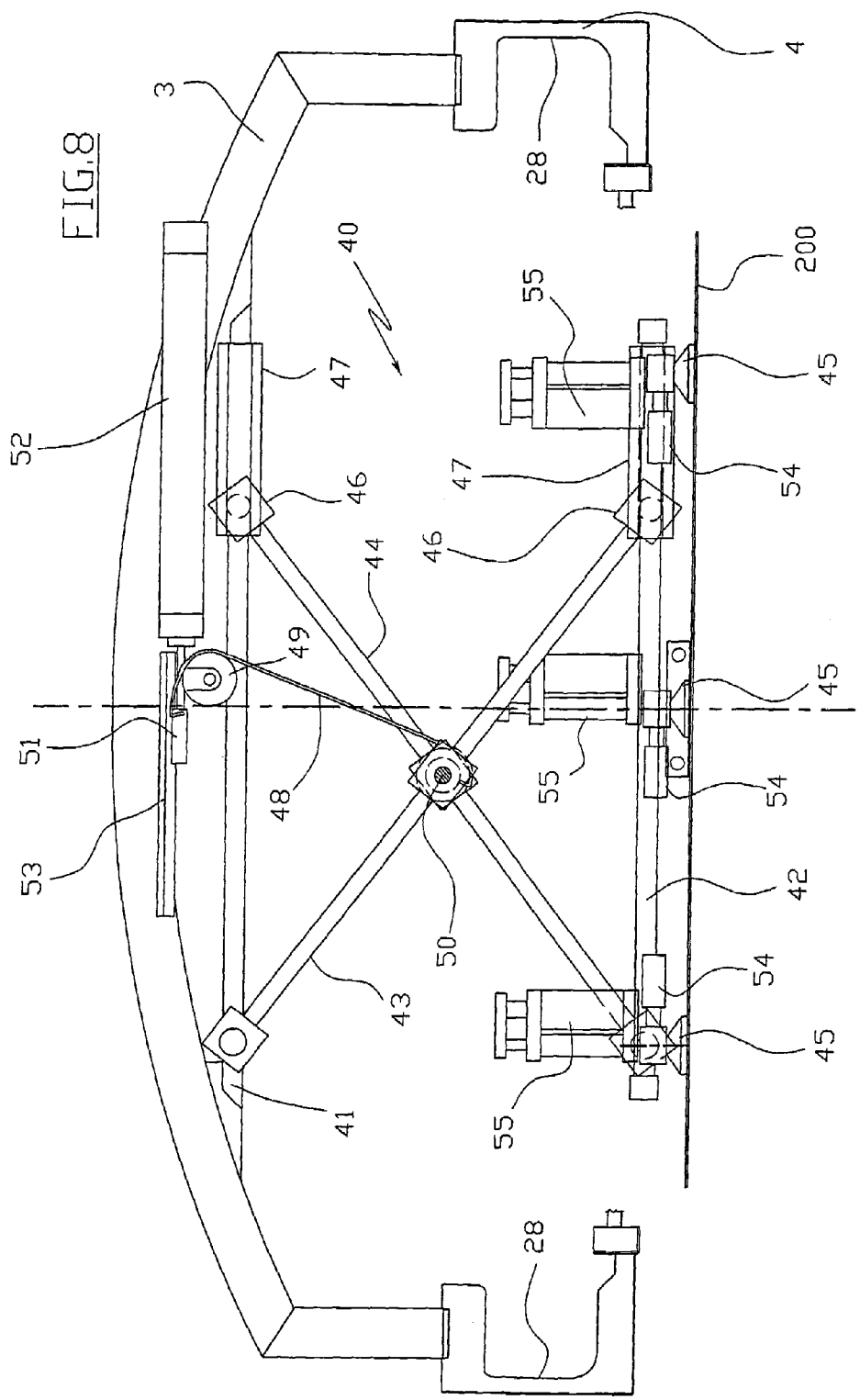

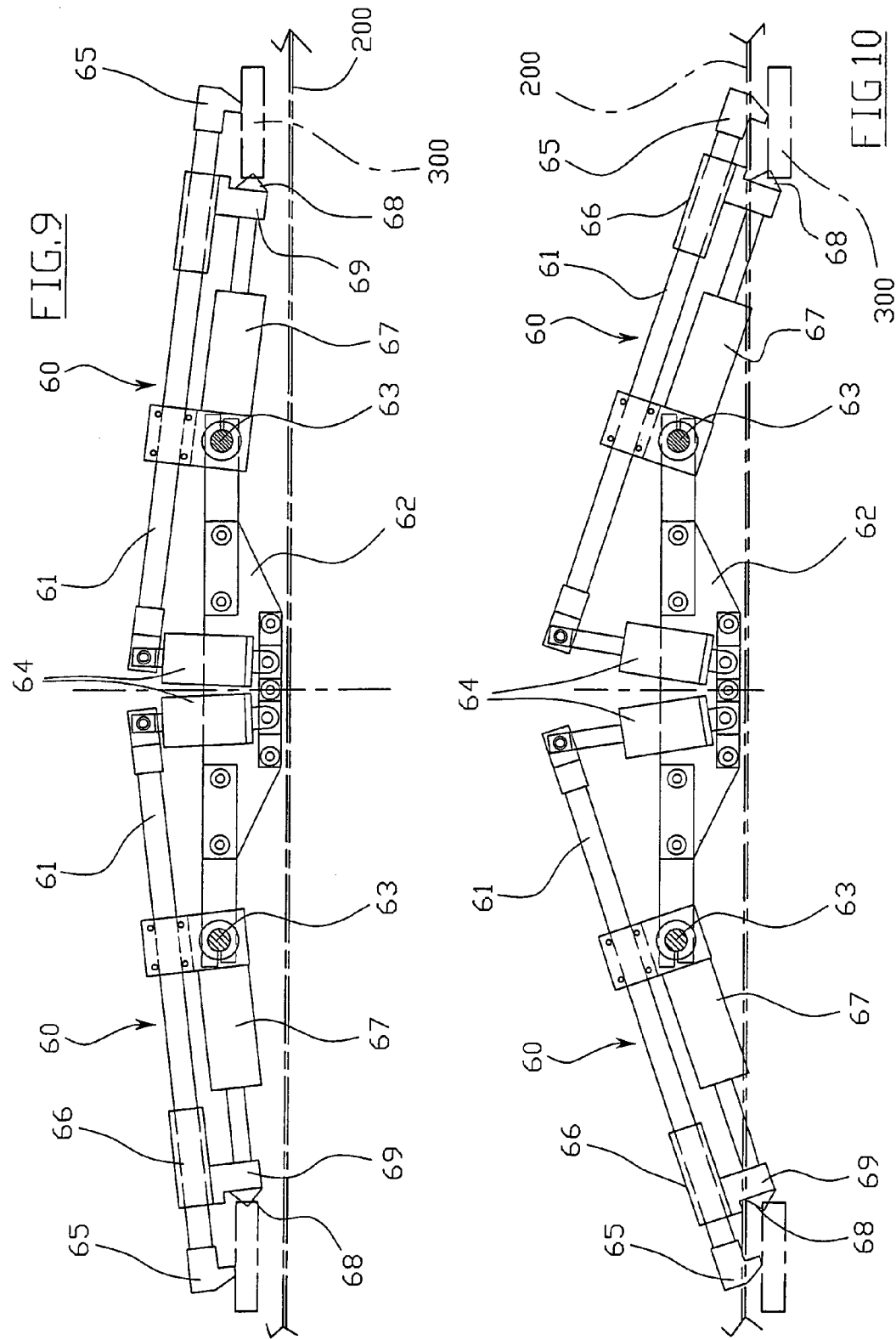

HANDLING UNIT FOR PALLETIZING

TECHNICAL FIELD

The present invention relates to a handling unit for palletizing.

More particularly, the present invention relates to a unit manipulated by a transfer system (e.g. a portal crane or a robot) for rapid automatic palletizing of goods.

PRIOR ART

Palletizing consists of organizing the arrangement and packaging of goods such as to make it possible to use loading pallets in goods transport and storage.

For palletizing, it is known to use palletizers which comprise separate units performing specific activities necessary to complete palletizing.

DISCLOSURE OF THE INVENTION

The object of the present invention is to provide a handling unit for palletizing having a flexible sliding panel that is driven along rails that have a horizontal section and a circular section.

BRIEF DESCRIPTION OF THE DRAWINGS

Further characteristics and advantages of the invention will be apparent on reading the ensuing description provided by way of non-limiting example, with the aid of the figures shown in the accompanying drawings, in which:

FIG. 5 shows a loading stage of the unit of FIG. 1;

FIG. 6 shows a second embodiment of the handling unit of the invention;

FIG. 7 is a schematic view of the unit of FIG. 1 from above, with the loading trolley in its jutting position;

FIG. 8 is a front schematic view of the unit 1 provided with means for taking and releasing slip sheets;

FIGS. 9 and 10 are a side view of the surround taking and release means, with the surround shown raised and to be raised respectively.

BEST MODE FOR CARRYING OUT THE INVENTION

Figure 1:
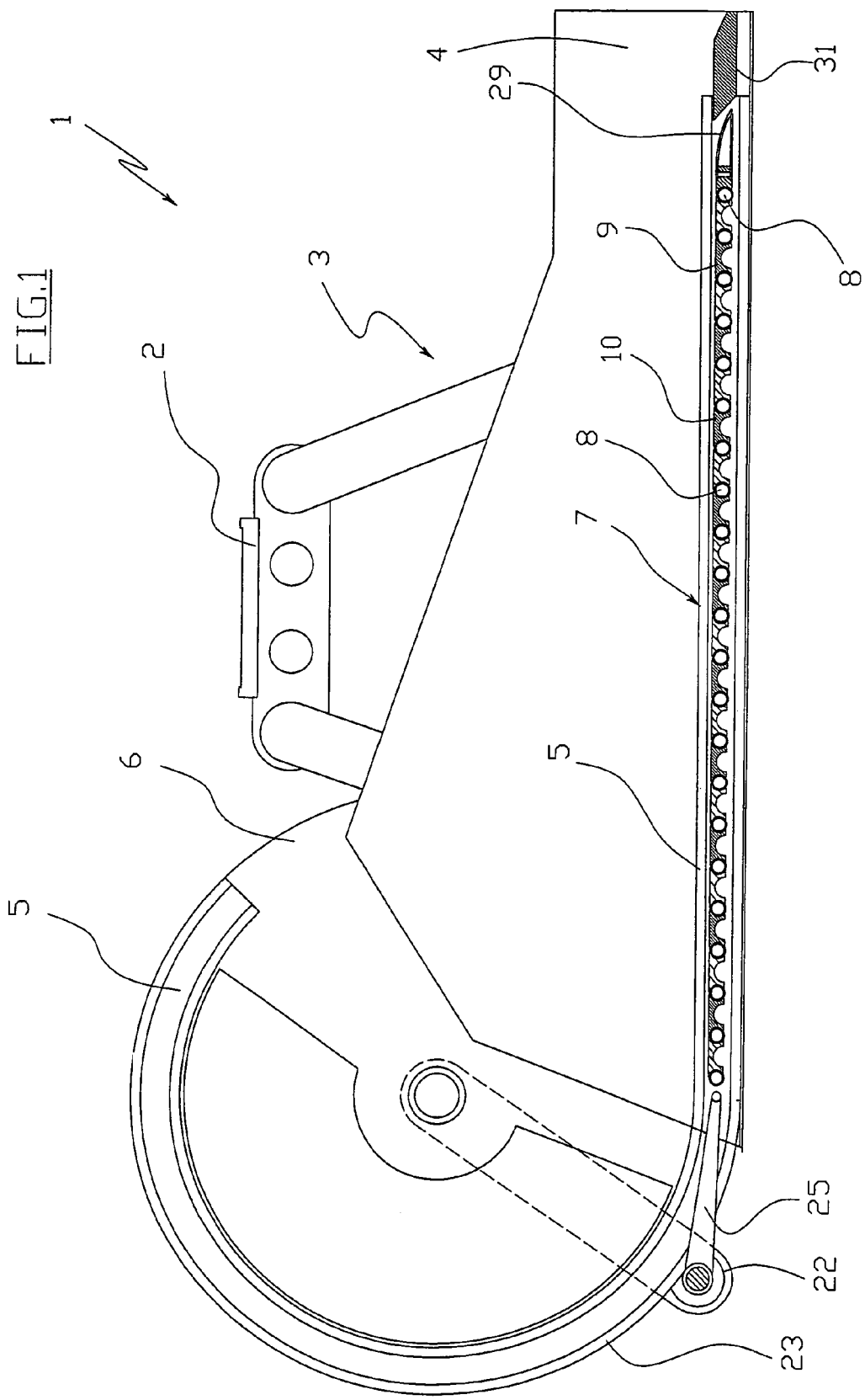
FIG. 1 is a side view of a handling unit according to the invention, with its sliding panel shown in section in the extended position.

With reference to said figures, the reference numeral 1 indicates overall a handling unit according to the present invention.

Said handling unit 1 comprises a support 2 for coupling to manipulator means, such as a portal crane or a robot, not shown, operated by a control unit controlled by suitably programmed software.

The unit 1 comprises a framework, indicated overall by 3, lowerly defining an aperture for the fall of articles to be palletized.

Said framework 3 comprises a pair of vertically extending opposing side walls 4, of which only one is visible in the figures, associated with the coupling support 2 and disposed parallel to each other.

According to the present invention, the framework 3 is provided with a pair of opposing parallel rails 5 a first section of which extends along two circumferential portions and a second section horizontally along the two side walls 4.

Preferably, the first section of rail 5, which extends along the circumferential portion, lies external to the two side walls 4 and coaxial to a pair of circular protection walls 6.

In the example, each rail 5 is in the form of a C-shaped slide groove.

The opposing grooves 5 house a sliding panel in the form of a rolling shutter 7 able to slide between an extended position (FIG. 1) in which it completely closes the lower aperture of the framework 3, and a retracted position (FIG. 2) in which it opens this aperture.

When in its extended position, the rolling shutter 7 is able to handle a load of articles positioned on it; in passing from its extended position to its retracted position, the rolling shutter 7 releases the articles to be palletized through the lower aperture of the framework 3.

The rolling shutter 7 is made to slide by suitable drive means described in detail hereinafter.

Figure 3:
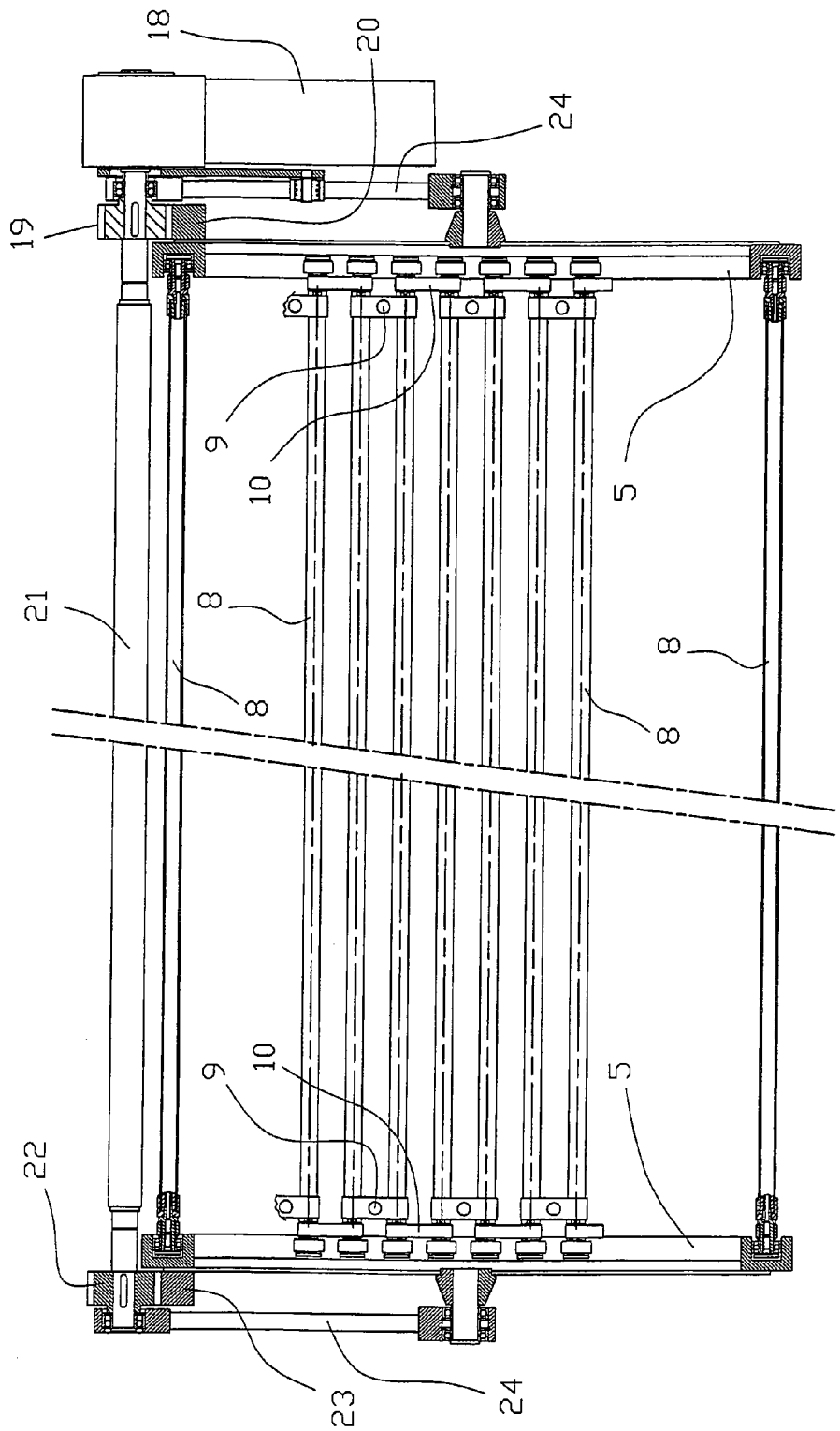
FIG. 3 is a section on the line III-III of FIG. 2.

According to a preferred embodiment of the present invention, the rolling shutter 7 comprises a plurality of parallel tubular bars or rods 8 connected together by two opposing series of mutually offset chain links 9, 10 (FIG. 3).

Figure 4A:
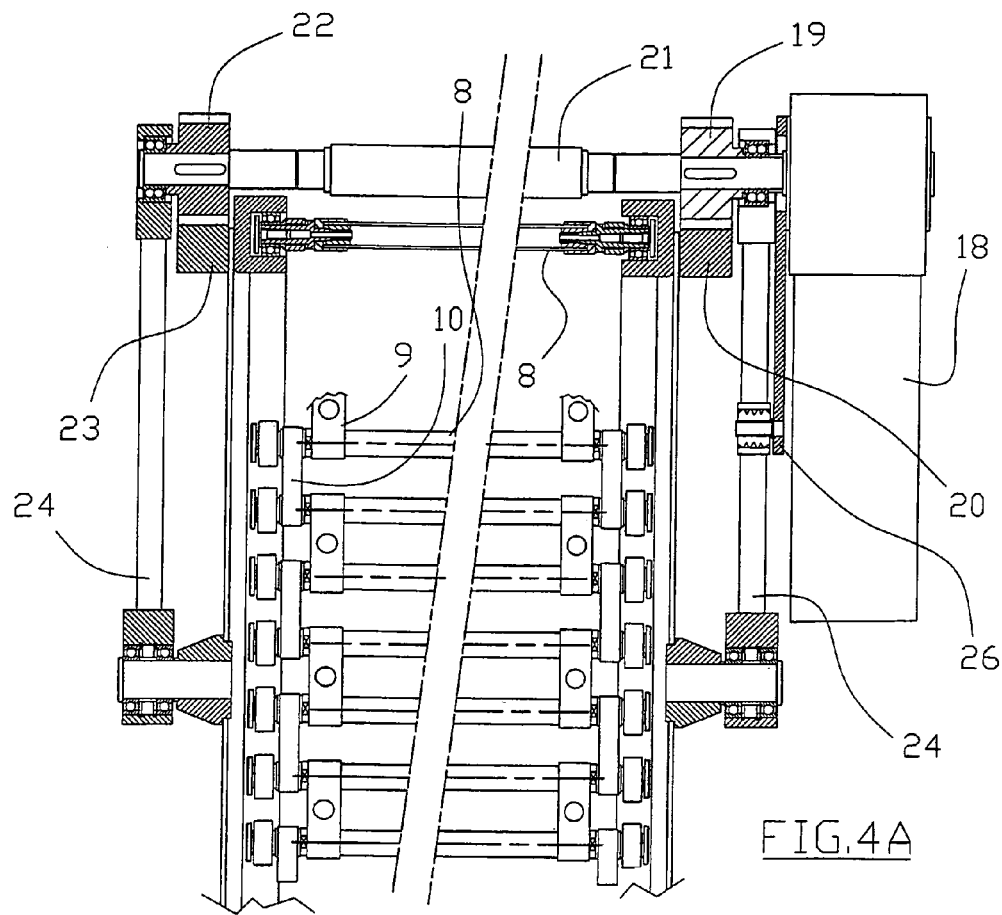
FIGS. 4A and 4B show enlarged details of FIG. 3.

Said chain links are in the form of a first series of blocks 9 connecting together consecutive pairs of rods 8 and a second series of blocks 10 offset from the blocks 9 of the first series and connecting together the two adjacent rods 8 of one and the next pair connected together by the blocks 9 of the first series (FIG. 4A).

Figure 4B:
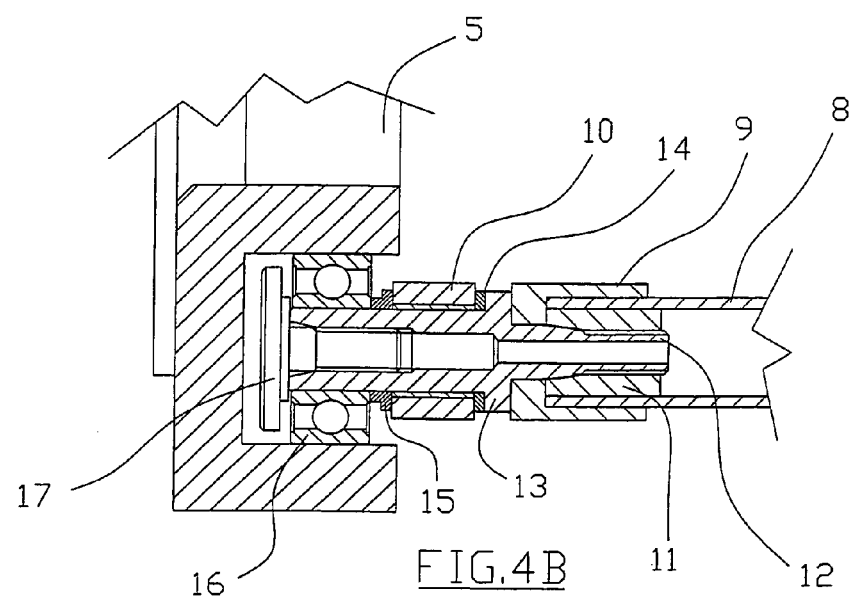

As can be seen in FIG. 4B, a bush 11 is inserted as an exact fit into each end of the rods 8, enabling the block 9 to be fixed by a pin 12 presenting on the central portion of its axial length a key seat 13 which abuts against the block 9, which is of cup shape in the region in which it is in contact with the end of the rod 8.

On that portion of the pin 12 distant from that screwed into the bush 11 there are mounted, starting from the key seat 13, a washer 14, the block 10, a spacer 15, a bearing 16 and finally a clamping screw 17 screwed into a threaded cavity provided at that end of the pin 12 opposite that screwed into the bush 11.

The bearings 16 enable the rolling shutter to slide within the guides 5 with less friction.

According to the present invention, the drive means are in the form of a gearmotor 18 (FIG. 4A) rotating a first movable drive pinion 19 engaging a fixed first rack 20 carrying one of the two first circumferential sections of rail 5 and extending perimetrally about one of the two circular protective walls 6.

The first drive pinion 19 is keyed axially onto the end of a drive bar or shaft 21, on the opposite end of which there is keyed a second movable drive pinion 22 engaging a second fixed rack 23, parallel to the first rack 20, carrying the other first circumferential section of rail 5 and extending perimetrally about the other circular protective wall 6.

The pinions 19, 22 are maintained constantly engaged with the first rack 20 and second rack 23 respectively by a pair of rigid arms 24, acting as spacers, rotatably associated, in accordance with the known art, with the respective centres of the opposing circular elements 6, concentric with the circumferential portion of the first section of the rails 5.

Figure 2:
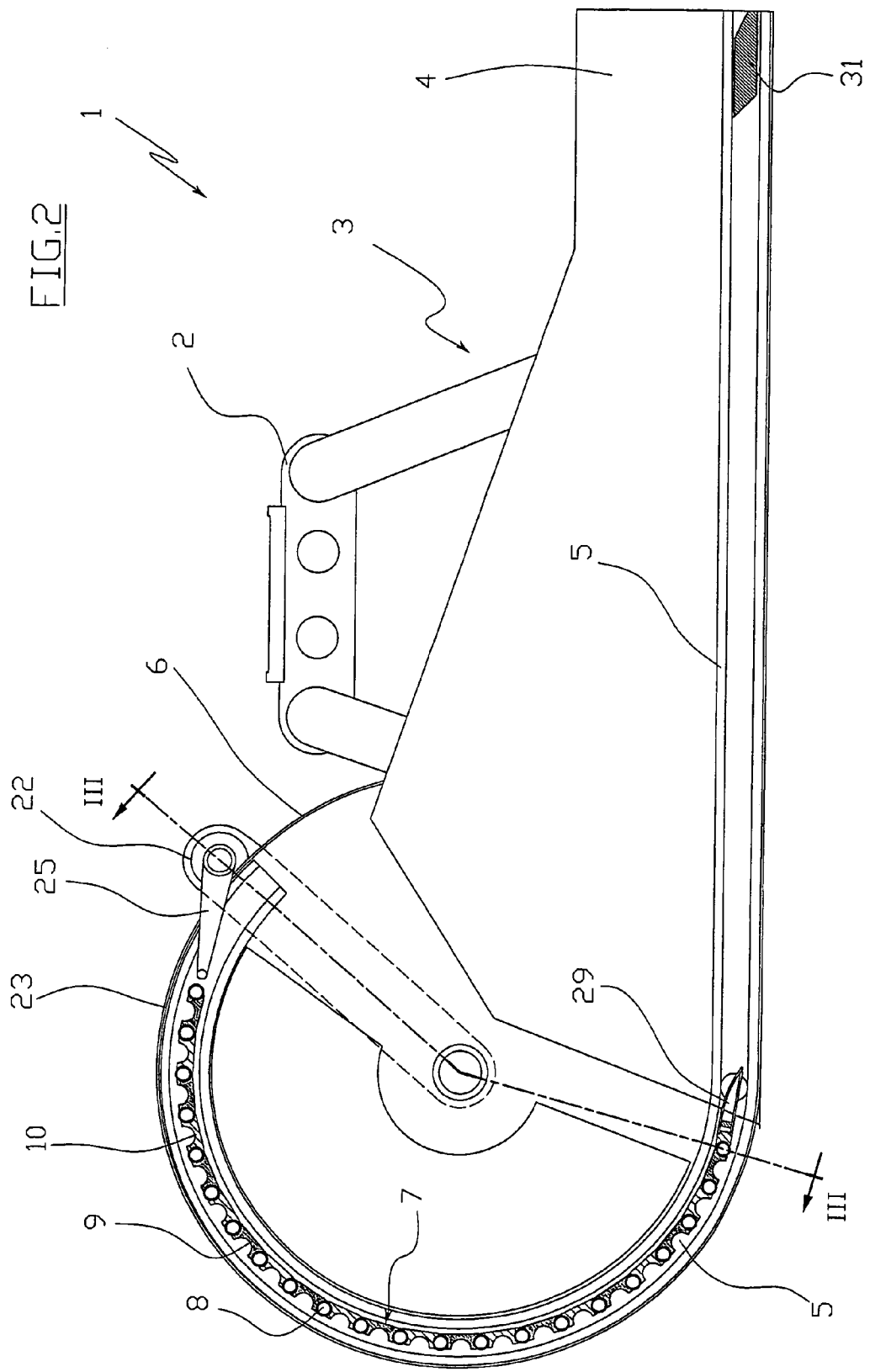
FIG. 2 shows the unit of FIG. 1 with its sliding panel in the retracted position.

The pinions 19, 22 are associated with the rolling shutter 7 via a pair of opposing connecting rods 25 (FIGS. 1, 2).

Essentially, the rolling shutter 7 is made to slide along the grooves 5 by rotating the drive pinions 19 and 22, which rotate along the racks 20, 23 to drag the rolling shutter 7 connected to the shaft 21 by the connecting rods 25.

To enable the drive shaft of the gearmotor 18, keyed directly onto the first drive pinion 19, to rotate not only about its own axis but also about the axis of the circular elements 6, as in the case of the pinions 19, 22, the gearmotor 18 is fixed to one of the arms 24 by a support piece 26 (FIG. 4A) interposed between one of the two arms 24 and the gearmotor 18. To enable articles, for example plastic bottles collected in groups, to be more easily loaded onto the surface formed by the extended rolling shutter 7, a chute 29 can be used associated with the free end of the rolling shutter 7 and hence slidable with it; when in the extended portion the chute 29 abuts against a corresponding facilitation step 31 fixed to the two side walls 4 and lying perpendicular to it.

The unit 1 can be loaded by external pusher means or, preferably, by using loading means housed on the unit itself.

In the illustrated embodiment, and as visible in FIG. 7, the loading means are in the form of a loading carriage 32 slidingly associated with a pair of parallel opposing guides 28 provided on the inner side of the side walls 4 of the framework 3.

The carriage 32 is made to slide along the guides 28 by three telescopic arms, namely an inner arm 33a, intermediate arm 33b and outer arm 33c, with the inner arm 33a slidable within the guides 28.

Specifically, the intermediate arm 33b slides along a guide provided on the inner arm 33s in a manner not to interfere with this latter, whereas the outer arm 33c slides inside the intermediate arm 33b.

A first bar 34 centrally supporting a first collection wall 35 of the loading carriage 32 is fixed perpendicular to the free ends of the outer arm 33c.

The intermediate arms 33b have fixed thereto the ends of a second rigid bar 36, positioned parallel to the first bar 34 and centrally supporting a second collection wall 37 of the loading carriage 32 which faces the first wall 35.

Essentially, the two opposing collection walls 35, 37 of the loading carriage 32, which are positioned perpendicular to the side walls 4, are made to move relative to each other by the relative movement between the outer arm 33c and the intermediate arm 33b.

Two opposing telescopic lateral walls of the carriage 32 are fixed perpendicular to the two opposing bars 34, 36, parallel to the telescopic arms 33a, 33b, 33c and to the side walls 4. Each lateral wall comprises two lateral telescopic arms 38a, 38b having their free ends slidingly associated with the respective opposing bars 34, 36.

Essentially, the lateral arms 38a, 38b, and hence the telescopic lateral walls, can slide not only in the longitudinal direction in compliance with the relative movement between the intermediate arm 33b and the outer arm 33c, but also perpendicular to their length, along the opposing bars 34, 36. Said telescopic lateral walls are driven symmetrically to approach and withdraw from each other transversely by a pair of abutting pneumatic cylinders 39 fixed centrally to one of the bars, namely to the bar indicated by 36 in the example.

Consequently, the collection space bounded by the carriage 32 can be determined on the basis of the space occupied by the bottles to be loaded, by simply adjusting the relative distance between the telescopic lateral walls formed by the lateral arms 38a, 38b by means of the cylinders 39, and adjusting the relative distance between the remaining two walls 35, 37 by relative movement between the intermediate arm 33b and the outer arm 33c.

According to the present invention, the unit 1 is able to create pallets of products formed from several overlying layers. Some types of products require a layer of material known as a slip sheet to be interposed between two successive layers.

This is made possible by means for taking and releasing slip sheets 200 associated with the unit 1, to be placed on each layer of bottles to be palletized.

Said means for taking and releasing slip sheets, shown in FIG. 8, comprise a pantograph structure 40 carrying a plurality of suckers 45 arranged to adhere to the surface of a supported slip sheet 200.

Said pantograph structure 40 comprises a fixed first frame 41, a vertically movable second frame 42, these being positioned horizontally parallel to each other, a third frame 43 and a fourth frame 44, these being disposed in X formation, interposed between the first frame 41 and second frame 42 and pivoted to, enable the second frame 42, carrying the suckers, to move towards and away from the first frame 41.

The third frame 43 and fourth frame 44 have one of their ends hinged respectively to the fixed first frame 41 and to the movable second frame 42, on a common vertical plane, which lies to the left in the example of FIG. 8. They are also pivoted, with centre indicated by 50, close to the point in which they cross, while the remaining free ends, located to the right in FIG. 8, are each hinged to a slider 46 slidingly associated with a guide 47 fixed respectively to the first frame 41 and to the second frame 42.

The movable second frame 42 is raised and lowered relative to the overlying fixed first frame 41 by a pair of toothed belts 48 of defined length, fixed at one end to a pair of reels, not shown, fixed idly on a shaft positioned coaxial to the central fulcrum, and at their opposite end to a trolley 51 operated by a cylinder 52 for its sliding along a track 53 fixed to the first frame 41. Between the trolley 51 and the reels on which the respective ends of the belts 48 are fixed, a pair of toothed pulleys 49 are interposed, about which the belts 48 travel. Said pulleys are positioned centrally on the fixed first frame 41.

Essentially, the second frame 42 is raised by operating the cylinder 52 to push the trolley 51 which drags with it the belts 48, these acting to fold the third frame 43 and fourth frame 44 to hence raise the second frame 42 and move the fulcrum 50 close to the pulleys 49.

In other words, the third frame 43 and the fourth frame 44 move as scissors pivoted on the centre 50 and operated by the cylinder 52.

The trolley 51 and the third frame 43 and fourth frame 44 slide in a direction perpendicular to the side walls 4.

In the illustrated example, the suckers 45 are five in number, of which four are disposed at the corners of the second frame 42 and one disposed centrally, supported by a small frame. Each sucker 45 is connected to a venturi valve 54 which on taking the slip sheet 200 creates and maintains a vacuum within the sucker 45 to obtain a perfect seal with the slip sheet 200. To release the slip sheet 200, the valves 54 again put the cavity between the sucker 45 and slip sheet 200 "under pressure" to hence cause this latter to fall.

As the slip sheets 200 are stacked, it may happen that because of an engulfing effect, when a slip sheet 200 is picked up, that underneath is also involuntarily picked up. To overcome this drawback, a cylinder 55 is used for each sucker 45. Said cylinders 55 are operated to create, after the slip sheet 200 has been picked up, a disordered movement of the five suckers 45, to hence release any slip sheet involuntarily sucked up.

According to the preferred embodiment of the present invention and as shown in FIG. 9, the unit 1 further comprises means for taking and releasing retention surrounds 300 to place on the top of the rows of bottles positioned on the pallet.

Said means for taking and releasing surrounds comprise two pairs of opposing rocker members 60, each rocker member 60 consisting in the example of a rigid pair of parallel arms 61. Said rocker members are centrally pivoted to the ends of a pair of brackets 62 fixed, parallel to the side walls 4, to the two opposing sides of the vertically movable second frame 42. Each rocker member 60 is rotated, about rotation pins 63 having horizontal axes perpendicular to the side walls 4, by a cylinder 64 pivoted centrally to the bracket 62 and with the end of the piston rod pivoted on one end of the rocker member 60. At the opposite end to that pivoted to the piston rod of the cylinder 60, each rocker member 60 carries a resting piece 65 which abuts against the upper wall of the surround 300 to be picked up.

A slide member 66 is mounted slidable on the parallel arms 61 of each rocker member 60 and is operated by a cylinder 67 also pivoted at the same point as the corresponding rocker member 60.

Each slide member 66 is fixed to a lower base 69 carrying engagement means comprising a pair of resilient conical elements 68 disposed such as to be able to engage the inner wall of the surround 300. The bases 69 are fixed to the end of the piston rod of the cylinders 67 which operate the slide member 66.

Essentially, the rocker member 60 intercepts the surround 300 to be picked up by means of the resting piece 65, while the resilient conical elements 68, guided by the slide member 66 along the parallel arms 61 of the rocker member 60, engage the surround 300 to be raised, aided by the cylinders 64.

In operation, the unit 1 picks up a slip sheet 200 by means of the suckers 45; the cylinders 55 are operated to allow any involuntarily picked-up slip sheets to fall, after which the picked-up slip sheet is raised by operating the cylinder 52, which by means of the belts 48 raises the pantograph structure 40 carrying the suckers 45 to which the slip sheet 200 is attached. The unit 1 with the slip sheet 200 carried by it moves above the groups of bottles to be loaded by the movable carriage 32 already positioned jutting from the side walls 4 and with the rolling shutter 7 in its extended position. When the carriage 32 is positioned above the bottles to be withdrawn, the unit is lowered to enclose the bottles within the lateral walls of the carriage 32, taking care that the surface of the rolling shutter is coplanar with the surface on which the bottles to be withdrawn lie.

At this point the carriage 32 moves towards the rolling shutter 7 to hence load the bottles onto the unit 1.

The cylinder 52 is, operated to move the slip sheet 200 above the layer of bottles just loaded.

With the bottles loaded and the slip sheet positioned on top of them, the unit moves above the pallet and the rolling shutter 7 is rolled up about the circumferential portions to cause the layer of bottles with the slip sheet 200 on top to fall through the aperture and onto the pallet.

The slip sheet 200 is released from the suckers by operating the valves 45.

This cycle is repeated until the number of rows of bottles to be loaded onto the pallet has been reached. Before the last loading cycle, the unit picks up the surround 300 by moving above it and operating the cylinders 62 until the four resting pieces 65 bear against the upper wall of the surround 300. At this point the cylinders 67 are operated to thrust the four pairs of resilient conical elements 68 against the inner wall of the surround 300, which is hence raised with the aid of the simultaneous operation of the cylinders 64, and moved to a height such as not to constitute an obstacle to the subsequent withdrawal of the slip sheet 200 and of the bottles.

In practice, the handling unit 1 enables all the operations involved in palletizing to be carried out with minimum space requirements and with extreme efficiency in executing the various operations.

In a second embodiment of the invention, the unit, indicated by 1', comprises two facing rolling shutters 7' which slide respectively along a pair of opposing facing rails 5' (FIG. 6).

The lower aperture is closed by positioning the two rolling shutters 7' in mutual abutment along the central line through the aperture.

Essentially, the two rolling shutters 7' are made to approach each other to close the aperture and to withdraw to open it.

The drive means can be the same as those used for the unit 1 of the first embodiment and will therefore not be further described.

To prevent the articles pushed onto the rolling shutters 7' from being dragged as these latter slide apart, a pair of movable stops 30 are used, operated by suitable means of known type.

As will be appreciated from the aforegoing description, the handling unit of the invention enables all palletizing operations to be effected, including positioning of the slip sheets and the surrounds. This is achieved by a single compact and extremely versatile unit.

An expert of the art can apply numerous modifications and variants to the aforedescribed handling unit to satisfy specific contingent requirements, all of which however are contained within the scope of protection of the invention, as defined by the following claims.

The invention claimed is:

1. A handling unit (1) for palletizing, characterised by comprising:
   a support (2) for coupling to manipulator means;
   a framework (3) associated with said support (2) and defining an aperture;
   a pair of parallel opposing slide rails (5) fixed to said framework (3);
   at least one flexible sliding panel (7) slidable along said rails (5) between an extended position in which the panel extends over said aperture to enable the panel to support articles to be palletized, and a retracted position in which the panel opens said aperture to enable said articles to fall through said aperture;
   drive means (18, 19) for oscillating said panel (7) along said rails (5) between said extended position and said retracted position wherein said rails have a first longitudinal section that extends along two opposing circular arc portions and a second longitudinal section that extends along two opposing horizontally linear portions, said sliding panel (7) occupying only the first section of the rails extending along the two circular arc portions when slid into the retracted position.

2. A handling unit (1) as claimed in claim 1, wherein said sliding panel (7) occupies only the second section of the rails extending along the two horizontal portions when in the extended position.

3. A handling unit (1) as claimed in claim 2, wherein said framework (3) has a pair of vertical opposing side walls (4) defining said aperture therebetween.

4. A handling unit (1) as claimed in claim 3, wherein said horizontal portions of the second section of the rails (5) are fixed respectively to the inner sides of the pair of side walls (4).

5. A handling unit (1) as claimed in claim 1, wherein said drive means has at least one movable motor (18) rotating a first movable drive pinion (19) engaging a first fixed circumferential rack (20) with which one of the opposing circular arc portions of the first section of the rails (5) is associated.

6. A handling unit (1) as claimed in claim 5, wherein said first drive pinion (19) is axially keyed via a shaft (21) to a second movable pinion (22) engaging a second fixed circumferential rack (23) with which the remaining opposing circular arc portions of the first section of the rails (5) are associated.

7. A handling unit (1) as claimed in claim 6, wherein said first pinion (19) and said second pinion (22) are maintained constantly engaged with said first rack (20) and with said second rack (23) respectively, by a pair of rigid arms (24) rotatably associated with a pair of circular protective walls (6) coaxial with the circular arc portions of the first section of the rails (5).

8. A handling unit (1) as claimed in claim 7, wherein said first pinion (19) and said second pinion (22) are respectively associated with one end of said sliding panel (7) by a pair of opposing connecting rods (25).

9. A handling unit (1) as claimed in claim 1, wherein said sliding panel has a plurality of parallel cylindrical rods transverse to the sliding direction, connected together in pairs by offset chain links (9, 10).

10. A handling unit (1) as claimed in claim 9, wherein the ends of said rods (8) are rotatably associated with wheels (16) which roll within said rails (5).

11. A handling unit (1) as claimed in claim 1, comprising a pair of mutually facing sliding panels (7') slidable along a pair of mutually facing rails (5) between a position in which said panels (7') are positioned mutually abutting to completely close said aperture and a retracted position in which they are mutually withdrawn to open said aperture.

12. A handling unit (1) as claimed in claim 1, wherein said manipulator means comprise a robot.

13. A palletizer robot comprising a handling unit in accordance with claim 1.

14. A handling unit (1) as claimed in claim 1, comprising loading means for dragging articles to be palletized onto said panel (7) when in its extended position.

15. A handling unit (1) as claimed in claim 14, wherein said loading means comprise a loading carriage (32) slidingly associated with the framework (3).

16. A handling unit (1) as claimed in claim 15, wherein said loading carriage (32) presents a quadrangular configuration with its opposing sides adjustable towards and away from each other.

17. A handling unit (1) as claimed in claim 1, further comprising means for taking and releasing slip sheets.

18. A handling unit (1) as claimed in claim 17, wherein said means for picking up and releasing slip sheets comprise a pantograph structure (40) carrying a plurality of suckers (45) for adhering to the surface of a slip sheet (200).

19. A handling unit (1) as claimed in claim 18, wherein said suckers (45) are associated with venturi valves (45) for creating vacuum within the cavities of the suckers (45).

20. A handling unit (1) as claimed in claim 18, wherein each sucker (45) is driven by a cylinder (55).

21. A handling unit (1) as claimed in claim 1, further comprising means for picking up and releasing surrounds.

22. A handling unit (1) as claimed in claim 21, wherein said means for picking up and releasing surrounds comprise two opposing pairs of rocker members (60) with which means (68) are associated for engaging the surround.

23. A handling unit (1) as claimed in claim 22, wherein said rocker members (60) are pivoted on a pair of plates (62) which can be moved upwards away from the aperture and downwards towards the aperture.

* * * * *